United States Patent
Komatsu et al.

(10) Patent No.: US 10,650,842 B2
(45) Date of Patent: May 12, 2020

(54) SIGNAL DETECTION DEVICE, SIGNAL DETECTION METHOD, AND SIGNAL DETECTION PROGRAM

(71) Applicant: NEC Corporation, Minato-ku, Tokyo (JP)

(72) Inventors: Tatsuya Komatsu, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 170 days.

(21) Appl. No.: 15/759,571

(22) PCT Filed: Jun. 16, 2016

(86) PCT No.: PCT/JP2016/002904
§ 371 (c)(1),
(2) Date: Mar. 13, 2018

(87) PCT Pub. No.: WO2017/046976
PCT Pub. Date: Mar. 23, 2017

(65) Prior Publication Data
US 2019/0156853 A1 May 23, 2019

(30) Foreign Application Priority Data
Sep. 16, 2015 (JP) .................. 2015-182816

(51) Int. Cl.
*G10L 25/51* (2013.01)
*G10L 21/0308* (2013.01)
(Continued)

(52) U.S. Cl.
CPC .......... *G10L 21/0308* (2013.01); *G06F 17/16* (2013.01); *G06K 9/623* (2013.01);
(Continued)

(58) Field of Classification Search
CPC ............. G10L 21/0272; G10L 21/0208; G10L 21/0232; G10L 21/028; G10L 21/02;
(Continued)

(56) References Cited

U.S. PATENT DOCUMENTS

2013/0010968 A1* 1/2013 Yagi .................. G10L 21/028
381/17
2014/0114650 A1* 4/2014 Hershey .............. G10L 21/0232
704/203

FOREIGN PATENT DOCUMENTS

JP 2014-134688 A 7/2014
JP 2014-137389 A 7/2014

OTHER PUBLICATIONS

Courtenay V. Cotton et al., "Spectral vs. Spectro-Temporal Features for Acoustic Event Detection", 2011 IEEE Workshop on Applications of Signal Processing to Audio and Acoustics, Oct. 2011.
(Continued)

*Primary Examiner* — Huyen X Vo

(57) ABSTRACT

A signal detection device 10 includes a compression unit 11 which compresses an activation matrix by adding to each column an element of the row corresponding to a basis mapped to the information of the same acoustic element in an activation matrix computed by non-negative matrix factorization using a basis matrix, using the information of acoustic elements making up an acoustic event, mapped to the basis constituting the basis matrix.

16 Claims, 8 Drawing Sheets

(51) Int. Cl.
　　　*G06F 17/16*　　　(2006.01)
　　　*G06K 9/62*　　　(2006.01)
　　　*G10L 25/27*　　　(2013.01)
　　　*G10L 25/18*　　　(2013.01)

(52) U.S. Cl.
　　　CPC ............ *G06K 9/6223* (2013.01); *G10L 25/51* (2013.01); *G10L 25/18* (2013.01); *G10L 25/27* (2013.01)

(58) Field of Classification Search
　　　CPC ..... G10L 21/0224; G10L 25/81; G10L 13/10; G10L 15/00; G10L 15/063; G10L 15/16; G10L 15/20; G10L 17/00; G10L 19/0212; G10L 19/038; G10L 19/26; G10L 2021/02087; G10L 2021/02161; G10L 25/27; G10L 25/51; G10L 25/21; G10L 2015/025
　　　See application file for complete search history.

(56) References Cited

OTHER PUBLICATIONS

International Search Report for PCT Application No. PCT/JP2016/002904, dated Aug. 23, 2016.

* cited by examiner

EXPRESSION USING LINEAR COMBINATION BETWEEN ARBITRARY BASES IS AVAILABLE

SIGNAL DETECTION DEVICE, SIGNAL DETECTION METHOD, AND SIGNAL DETECTION PROGRAM

This application is a National Stage Entry of PCT/JP2016/002904 filed on Jun. 16, 2016, which claims priority from Japanese Patent Application 2015-182816 filed on Sep. 16, 2015, the contents of all of which are incorporated herein by reference, in their entirety.

TECHNICAL FIELD

The present invention relates to a signal detection device, a signal detection method, and a signal detection program.

BACKGROUND ART

A technology for separating sound sources by performing non-negative matrix factorization (referred to as NMF below) has been known. The NMF is a matrix resolution method, such as the following Formula (1), for approximating a matrix V with f rows and t columns which is a spectrogram to a product of a spectral basis matrix W with f rows and k columns and an activation matrix H with k rows and t columns. The reference k is a parameter indicating the number of bases.

$$V \approx WH \quad \text{Formula (1)}$$

NPL 1 discloses a technology for detecting an acoustic event included in an acoustic signal using the NMF.

The acoustic event is a pattern of the acoustic signal corresponding to a physical event. According to a transition of a physical state caused by the physical event, an acoustic signal pattern in the corresponding section changes.

The acoustic element is an acoustic signal pattern corresponding to a predetermined physical state. The acoustic signal pattern has an amplitude same as that available in the predetermined physical state. That is, the acoustic element is an acoustic signal pattern having an amplitude.

The acoustic element corresponds to an acoustic signal for one frame or a fragment of the acoustic signal for a plurality of frames on a spectrogram. That is, the acoustic signal pattern is resolved by the acoustic element corresponding to each physical state so that the acoustic event can be easily detected.

Hereinafter, an outline of a method of detecting the acoustic event disclosed in NPL 1 will be described.

In the detection method described in NPL 1, firstly, a short-time Fourier transform is performed relative to the acoustic signal to convert the acoustic signal into the spectrogram. Next, in the detection method described in NPL 1, by performing the NMF to the converted spectrogram, an expression degree of a spectral basis dictionary included in the spectrogram is computed.

In the detection method described in NPL 1, whether the acoustic event is included in the acoustic signal is identified using a combination of the computed expression degrees. With the detection method described in NPL 1, in the above procedure, the acoustic event included in the acoustic signal is detected.

Hereinafter, the method of detecting the acoustic event described in NPL 1 will be more specifically described. In the detection method described in NPL 1, first, the NMF is performed to a spectrogram in which acoustic signals (known acoustic signals) including sounds to be detected are connected to each other to generate the spectral basis dictionary.

Next, in the detection method described in NPL 1, an unknown acoustic signal is converted into a spectrogram by performing the short-time Fourier transformation, and an activation (expression degrees) of each basis forming the generated spectral basis dictionary in the converted spectrogram is computed.

Next, in the detection method described in NPL 1, whether the acoustic event is included is identified using a combination of the computed activations to detect the acoustic event included in the unknown acoustic signal. In the detection method described in NPL 1, the acoustic event is detected on the basis of an assumption such that the activations of the respective bases regarding the same acoustic event show a similar tendency.

The activation is computed when the spectrogram is resolved by performing the NMF using the spectral basis dictionary. In addition, for example, a hidden Markov model (HMM) is used for identifying presence or absence of the acoustic event using the combination of the activations.

CITATION LIST

Non Patent Literature

NPL 1: Courtenay V. Cotton and Daniel P. W. Ellis, 'SPECTRAL VS. SPECTRO-TEMPORAL FEATURES FOR ACOUSTIC EVENT DETECTION', 2011 IEEE Workshop on Applications of Signal Processing to Audio and Acoustics

SUMMARY OF INVENTION

Technical Problem

The technology described in NPL 1 has a feature such that a detection accuracy is hardly influenced by a signal-to-noise ratio (SNR). However, the technology described in NPL 1 has a disadvantage such that it is difficult to accurately detect a signal even in a case where the SNR is high, that is, in a state where the signal is easily detected.

This is because there is a plurality of combinations of the spectral basis and the activation, capable of expressing the spectrum, which have been computed by performing the NMF using the spectral basis dictionary. That is, the combination selected in the NMF is different for each processing. Therefore, the activation computed by performing the NMF does not constantly indicate a predetermined result every time and is not stable.

Due to the instability described above, if an activation other than the predetermined result is computed, identification of the presence or absence of the acoustic event may fail. That is, since the identification of the presence or absence of the acoustic event does not succeed every time, the technology described in NPL 1 has a disadvantage such that the accuracy of detecting the acoustic event is low.

The present invention solves the above problems. A purpose of the present invention is to provide a signal detection device, a signal detection method, and a signal detection program which can accurately detect an acoustic event.

Solution to Problem

A signal detection device according to the present invention includes a compression unit which compresses an activation matrix by adding to each column an element of the row corresponding to a basis mapped to the information of the same acoustic element in an activation matrix computed by non-negative matrix factorization using a basis matrix, using the information of acoustic elements making up an acoustic event, mapped to the basis constituting the basis matrix.

A signal detection method according to the present invention compresses an activation matrix by adding to each column an element of the row corresponding to a basis mapped to the information of the same acoustic element in an activation matrix computed by non-negative matrix factorization using a basis matrix, using the information of acoustic elements making up an acoustic event, mapped to the basis constituting the basis matrix.

A signal detection program according to the present invention causes a computer to execute compression processing of compressing an activation matrix by adding to each column an element of the row corresponding to a basis mapped to the information of the same acoustic element in an activation matrix computed by non-negative matrix factorization using a basis matrix, using the information of acoustic elements making up an acoustic event, mapped to the basis constituting the basis matrix.

Advantageous Effects of Invention

According to the present invention, an acoustic event can be accurately detected.

DESCRIPTION OF EMBODIMENTS

First Exemplary Embodiment

[Description of Configuration]

Figure 1:
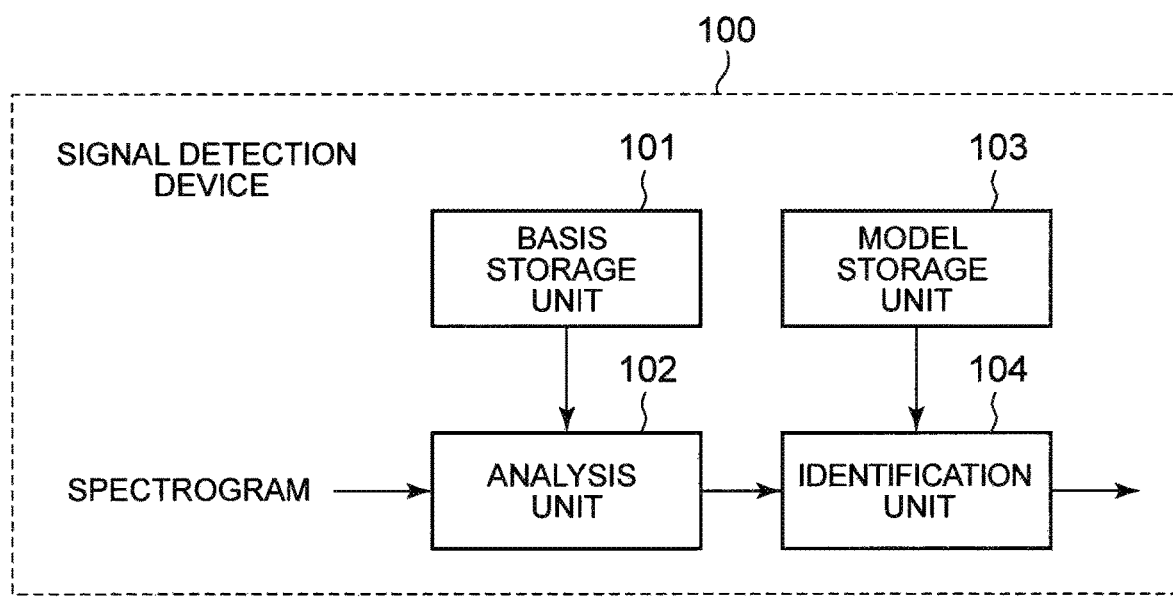
FIG. 1 is a block diagram showing a configuration example of a first exemplary embodiment of a signal detection device according to the present invention.

Hereinafter, embodiments of the present invention will be described with reference to the drawings. FIG. 1 is a block diagram showing a configuration example of a first exemplary embodiment of a signal detection device according to the present invention. A signal detection device 100 showed in FIG. 1 inputs a target signal as a spectrogram and identifies whether an acoustic event to be detected is included in the target signal on the basis of the input spectrogram.

The signal detection device 100 showed in FIG. 1 includes a basis storage unit 101, an analysis unit 102, a model storage unit 103, and an identification unit 104.

The basis storage unit 101 has a function of storing a basis matrix W and acoustic element ID information.

The acoustic element ID information is information indicating an acoustic element ID corresponding to each basis included in the basis matrix W. The acoustic element ID is an identification number associated with each acoustic element. The acoustic element ID may be allocated to each basis at a predetermined number from the head.

Furthermore, the acoustic element ID information may be expressed as a vector in which the acoustic element IDs respectively corresponding to the bases are arranged. In the present exemplary embodiment, the basis storage unit 101 stores an acoustic element ID vector C which is a vector in which the acoustic element IDs respectively corresponding to the bases are arranged.

The analysis unit 102 has a function of performing the NMF. The analysis unit 102 receives a spectrogram V as an input and performs the NMF using the basis matrix W to compute an activation matrix H. The spectrogram V is a spectrogram of an acoustic signal to be detected. Regarding the acoustic signal, it is determined whether the acoustic event is included.

That is, as indicated in Formula (1), the analysis unit 102 expresses the spectrogram V by a product WH of the basis matrix W and the activation matrix H. Hereinafter, a spectral basis included in the basis matrix W will be described as a basis having a time width corresponding to a single time frame.

When the NMF is performed, the analysis unit 102 specifically computes an activation matrix H with the minimum cost function D(V, W, H). As the cost function D, for example, a cost function $D_{KL}$ in generalized Kullback-Leibler divergence is used. An example of the cost function $D_{KL}$ is indicated in the following Formula (2).

[Mathematical Formula 1]

$$D_{KL}(V, WH) = V \circ \log\left(\frac{V}{WH}\right) + (WH - V) \qquad \text{Formula (2)}$$

The reference · in Formula (2) represents a product of the elements of the matrix. Furthermore, a fraction notation in Formula (2) represents a quotient of the elements of the matrix. Other than the $D_{KL}$, Frobenius norm, Itakura-Saito distance, and the like may be used as the cost function D.

To obtain the activation matrix H that minimizes the cost function D, for example, the analysis unit 102 updates the activation matrix H using the basis matrix W as indicated in the following Formula (3).

[Mathematical Formula 2]

$$H \leftarrow H \circ \left\{W^T\left(\frac{V}{WH}\right)\right\}/W^T O \qquad \text{Formula (3)}$$

The reference $W^T$ in Formula (3) represents a transposed matrix of the matrix W. The matrix O in Formula (3) has the same format as the spectrogram V, and represents a matrix of which all elements are one. As an initial value of the activation matrix H, a matrix $H_0$ generated to have a random number as an element is normally used.

The analysis unit 102 updates the activation matrix H according to Formula (3) until a predetermined condition is satisfied. The predetermined condition is, for example, that the value of the cost function D becomes equal to or less than a threshold value. Furthermore, the predetermined condition may be that the number of updates of the activation matrix H reaches a set number of repetitions.

Next, the analysis unit 102 performs compression processing to the activation matrix H for each acoustic element ID using the activation matrix H computed in a state where the predetermined condition is satisfied and the acoustic element ID vector C to generate a compression matrix H2. For example, the analysis unit 102 generates the compression matrix H2 as indicated in the following Formula (4).

[Mathematical Formula 3]

$$H2_{m,j} = \sum_{C(k)=m} H_{k,j} \qquad \text{Formula (4)}$$

The reference $H_{k,j}$ in Formula (4) represents an element at the k-th row and the j-th column of the activation matrix H. The reference $H2_{m,j}$ in Formula (4) represents an element at the m-th row and the j-th column of the compression matrix H2. The reference C(k)=m in Formula (4) represents that a k-th component of the acoustic element ID vector C, that is, the acoustic element ID is m.

In Formula (4), the elements of one or more rows of the activation matrix H associated with the acoustic element ID which is m are added for each column. One row generated by adding the elements for each column becomes a m-th row of the compression matrix H2.

That is, the compression processing is processing of reducing the number of rows of the activation matrix H to the number of acoustic elements by obtaining the sum of the elements in the activation matrix H associated with the same acoustic element ID for each acoustic element ID. Specifically, in a case of Formula (4), for example, the activation matrix H having k rows is compressed into the compression matrix H2 having m rows.

The model storage unit 103 has a function of storing an identification model. In the present exemplary embodiment, it is assumed that a support vector machine (referred to as SVM below) is stored in the identification model to which A is applied as an index and which is stored in the model storage unit 103.

The identification unit 104 has a function of detecting an acoustic event. The identification unit 104 identifies presence or absence of the acoustic event using the compression matrix H2 and the identification model. For example, the identification unit 104 uses an identification model having an index A stored in the model storage unit 103.

Specifically, the identification unit 104 generates a partial matrix P by cutting out a matrix for a predetermined time width from the compression matrix H2. The predetermined time width is, for example, 600 ms.

Next, the identification unit 104 computes a feature vector x by time averaging the partial matrix P. The identification unit 104 identifies the presence or absence of the acoustic event according to the following Formulas (5) and (6) using the feature vector x, a matrix A representing an identification surface learned by the SVM, and a vector b.

[Mathematical Formula 4]

$$f(x)=\text{sign}(g(x)) \qquad \text{Formula (5)}$$

$$g(x)=Ax+b \qquad \text{Formula (6)}$$

In a case where the reference f(x) indicated in Formula (5) is one, that is, in a case where the reference g(x) indicated in Formula (6) is positive, the identification unit 104 detects the feature vector x as an acoustic event to be detected. In a case where the reference f(x) indicated in Formula (5) is −1, that is, in a case where the reference g(x) indicated in Formula (6) is negative, the identification unit 104 does not detect an acoustic event.

The identification unit 104 may use a hidden Markov model or another identification scheme instead of the SVM. The model storage unit 103 stores an identification model corresponding to an identification scheme used by the identification unit 104.

With the above procedure, the identification unit 104 identifies the presence or absence of the acoustic event. The identification unit 104 may identify the presence or absence of the acoustic event by a procedure other than the above procedure.

Furthermore, by including the acoustic element ID vector C in the cost function D, the analysis unit 102 can improve a resolution performance of the acoustic element. For example, an example of the cost function D(V, W, H, C) to which a restriction condition $\Omega(H, C)$ is applied is indicated by the following Formula (7).

[Mathematical Formula 5]

$$D(V,W,H,C)=D_{KL}(V,WH)+\lambda\Omega(H,C) \qquad \text{Formula (7)}$$

The reference $\lambda$ in Formula (7) is a parameter that reflects the strength of the restriction. As the restriction condition $\Omega(H)$, for example, a restriction condition indicated by the following Formula (8) is used.

[Mathematical Formula 6]

$$\Omega(H) = \sum_{g} \log(\varepsilon + \|h_t^{(g)}\|) \qquad \text{Formula (8)}$$

To obtain the activation matrix H that minimizes the cost function D(V, W, H, C) to which the restriction condition is applied, the analysis unit 102 updates the activation matrix H, for example, as indicated in the following formulas (9) and (10).

[Mathematical Formula 7]

$$H \leftarrow H \circ \left\{ W^T \left( \frac{V}{WH} \right) \right\} / W^T O \qquad \text{Formula (9)}$$

$$h_t^{(g)} \leftarrow h_t^{(g)} / (1 + \lambda/\varepsilon + \|h_t^{(g)}\|) \qquad \text{Formula (10)}$$

The reference $h_t^{(g)}$ in Formula (10) represents an element of the activation matrix corresponding to the basis with which an acoustic element ID g is associated. The reference t of $h_t^{(g)}$ is a column index of the activation matrix H. That is, the reference $h_t^{(g)}$ is a column vector corresponding to the column index t and represents activation in a t-th time frame.

The analysis unit 102 updates the activation matrix H according to Formula (9) first, and then, repeats the computing to update $h_t^{(g)}$ for each group of the acoustic element IDs according to Formula (10) until the predetermined condition is satisfied. The predetermined condition is, for example, a condition such that the value of the cost function D becomes equal to or less than a threshold value. The predetermined condition may be a condition such that the number of computing reaches a set number of repetitions.

The reason why the restriction condition Ω(H) to lower the value as the number of acoustic elements used for the NMF is reduced is applied to the cost function D is as follows. For example, even when the NMF is performed on a spectrogram including one acoustic element, activation of an acoustic element other than the acoustic element of which the activation has a value has a value in some cases.

When the restriction condition Ω(H) that increases cost as the acoustic elements used for the NMF increases is applied, the number of acoustic elements of which the activation has a value is reduced as the value of the cost function D decreases. As a result, only activation of a superior acoustic element whose activation has a value has a value, and the above event does not occur. That is because, when the restriction condition Ω(H) is applied to the cost function D, a more stable activation matrix can be obtained.

As indicated in Formula (4), by obtaining the sum for each acoustic element ID, the elements of the plurality of activation matrices associated with the same acoustic element ID is computed as the elements of the single activation matrix. That is, the analysis unit 102 can use each basis associated with each row of the activation matrix H as a single basis.

Furthermore, even when the spectral basis included in the basis matrix W is a basis having a time width corresponding to a plurality of time frames, the signal detection device 100 can use the basis matrix W by performing Convolutive-NMF. A time width corresponding to the plurality of time frames is, for example, 100 ms.

In the above case, the spectral basis included in the basis matrix W is expressed as W(τ) using a time frame index τ. The spectrogram V is resolved, for example, as indicated by the following Formula (11).

[Mathematical Formula 8]

$$\sum_{t=0}^{T-1} W(\tau)\overset{t\rightarrow}{H} \qquad \text{Formula (11)}$$

The reference T in Formula (11) represents the time width of the basis corresponding to the plurality of time frames. The reference $H^{\wedge}(t\rightarrow)$ in Formula (11) represents an activation matrix H of which the elements have been moved to the right by t columns. As a specific example, a matrix $A^{\wedge}(1\rightarrow)$ obtained by moving the elements of the matrix A indicated in Formula (12) to the right by one column is indicated by the following Formula (13).

[Mathematical Formula 9]

$$A = \begin{pmatrix} 1 & 0 & 1 & 1 \\ 0 & 0 & 1 & 0 \end{pmatrix} \qquad \text{Formula (12)}$$

$$\overset{1\rightarrow}{A} = \begin{pmatrix} 0 & 1 & 0 & 1 \\ 0 & 0 & 0 & 1 \end{pmatrix} \qquad \text{Formula (13)}$$

In Formula (11), the value of the activation matrix H represents a timing of generation of W(0). W(1) is generated one frame after the generation of the W(0), and W(2) is generated two frames after the generation of the W(0).

An example of the cost function D in a case where the spectral basis included in the basis matrix W is a basis having a time width corresponding to a plurality of time frames is indicated by the following Formula (14).

[Mathematical Formula 10]

$$D_{KL}(V, WH) = V \circ \log\left(\frac{V}{\sum_{t=0}^{T-1} W(\tau)\overset{t\rightarrow}{H}}\right) + \left(\sum_{t=0}^{T-1} W(\tau)\overset{t\rightarrow}{H} - V\right) \qquad \text{Formula (14)}$$

To obtain the activation matrix H that minimizes the cost function D indicated in the following Formula (14), the analysis unit 102 updates the activation matrix H, for example, as indicated by the following Formula (15).

$$H \leftarrow H \cdot \{(W(\tau))^T \overset{\leftarrow}{R}\}/(W(\tau))^T O \qquad \text{[Mathematical Formula 11]}$$

Note that, $$R = \left(\frac{V}{\sum_{t=0}^{T-1} W(\tau)\overset{t\rightarrow}{H}}\right) \qquad \text{Formula (15)}$$

In the case of T=1, the formulas (14) and (15) are equivalent to the formulas of the NMF using the basis matrix W including the basis which has the time width corresponding to a single time frame. That is, the cost function D indicated in Formula (14) is equivalent to the cost function D indicated in Formula (2). The updating formula indicated by Formula (15) is equivalent to the updating formula indicated by Formula (3).

As described above, the signal detection device according to the present exemplary embodiment can accurately detect the acoustic event by resolving the acoustic events to each acoustic element corresponding to each physical state.

[Description of Operation]

Figure 2:
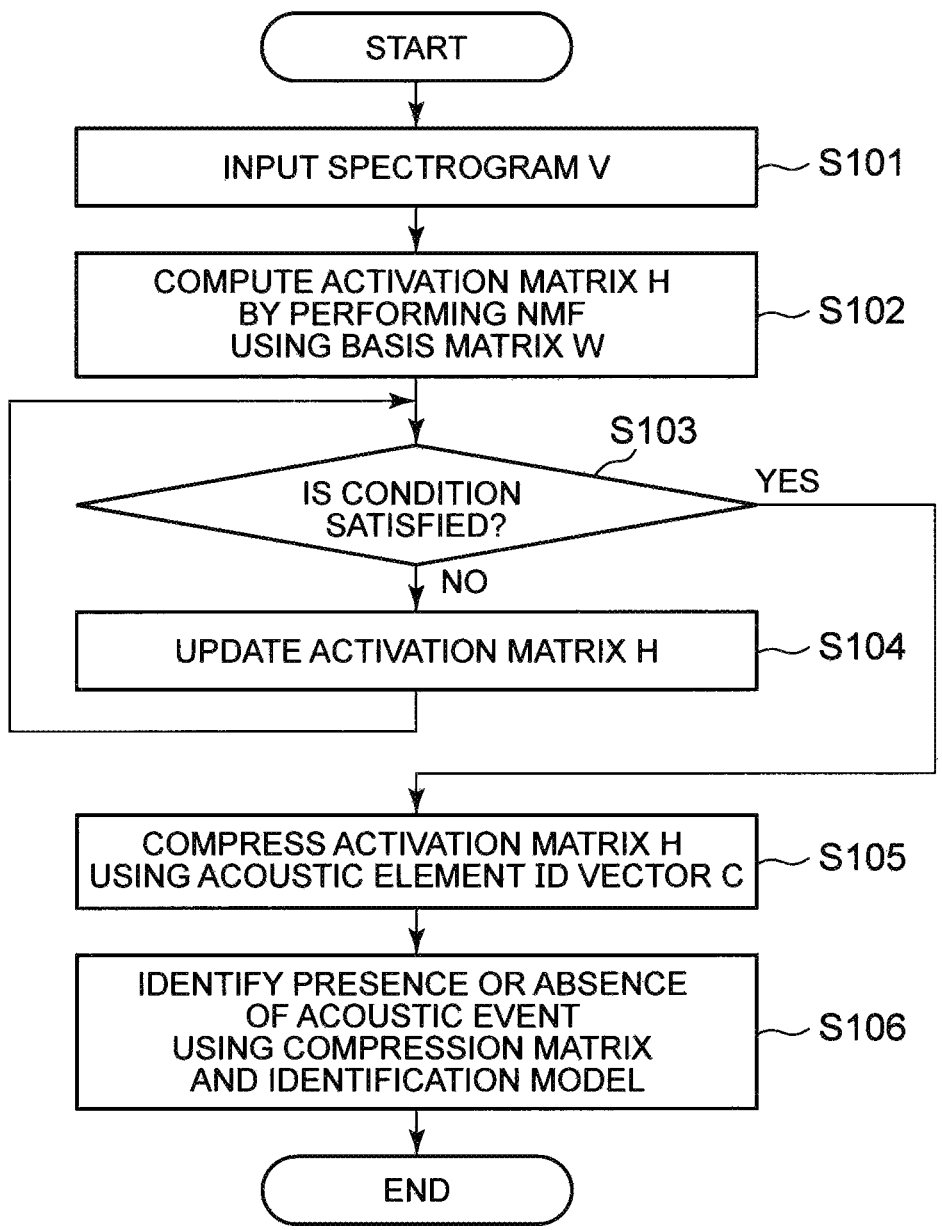
FIG. 2 is a flowchart showing an operation of signal detection processing by a signal detection device 100 according to the first exemplary embodiment.

Hereinafter, an operation of the signal detection device 100 according to the present exemplary embodiment will be described with reference to FIG. 2. FIG. 2 is a flowchart showing an operation of signal detection processing by the signal detection device 100 according to the first exemplary embodiment.

An acoustic signal to be detected is input to the analysis unit 102 as the spectrogram V (step S101).

Next, the analysis unit 102 performs the NMF to the input spectrogram V using the basis matrix W stored in the basis storage unit 101. By performing the NMF, the analysis unit 102 computes an activation matrix H (step S102).

Next, the analysis unit 102 confirms whether a predetermined condition is satisfied (step S103). In a case where the predetermined condition is satisfied (Yes in step S103), the analysis unit 102 performs processing in step S105.

When the predetermined condition is not satisfied (No in step S103), the analysis unit 102 updates the computed activation matrix H (step S104). After updating the activation matrix H, the analysis unit 102 confirms again whether the predetermined condition is satisfied (step S103).

The predetermined condition is, for example, that the value of the cost function D as described above is equal to or less than the threshold value, or that the number of times of update of the activation matrix H reaches a set number of repetitions. The predetermined condition may be a condition other than the above condition.

Next, the analysis unit 102 compresses the activation matrix H in a state where the predetermined condition is satisfied using the acoustic element ID vector C (step S105). The analysis unit 102 inputs a compression matrix which is the compressed activation matrix H to the identification unit 104.

Next, the identification unit 104 identifies whether an acoustic event is included in an acoustic signal using the compression matrix input from the analysis unit 102 and the identification model stored in the model storage unit 103 (step S106). The identification unit 104 outputs the identification result of the presence or absence of the acoustic event. After outputting the result, the signal detection device 100 terminates the signal detection processing.

[Description of Effect]

The signal detection device according to the present exemplary embodiment can extract the acoustic element forming the acoustic event to be detected by performing the NMF. At the time of the extraction, the analysis unit groups the bases using the acoustic element ID and obtains the sum of the elements of the activation matrix for each acoustic element ID to generate the compressed activation matrix. That is, the analysis unit does not simply and separately revolve the spectrogram for each basis included in the basis matrix and resolves the spectrogram in acoustic element units.

That is, since the acoustic event is regarded as a combination of corresponding physical states, a possibility that the analysis unit performs wrong NMF is low. Therefore, instability in activation caused by a plurality of combinations expressing spectra which is a disadvantage of the technology disclosed in NPL 1 is solved. The identification unit can accurately detect the acoustic event using the computed activation.

Furthermore, the signal detection device according to the present exemplary embodiment can perform the compression processing relative to the computed activation. When the compression processing is performed, since the number of dimensions of an identifier can be reduced to the minimum value that can be obtained, the signal detection device can realize both detection with high accuracy and computation with low cost. That is, in both cases where a signal-to-noise ratio is high and where the signal-to-noise ratio is low, the signal detection device can accurately detect the acoustic event.

Second Exemplary Embodiment

[Description of Configuration]

Figure 3:
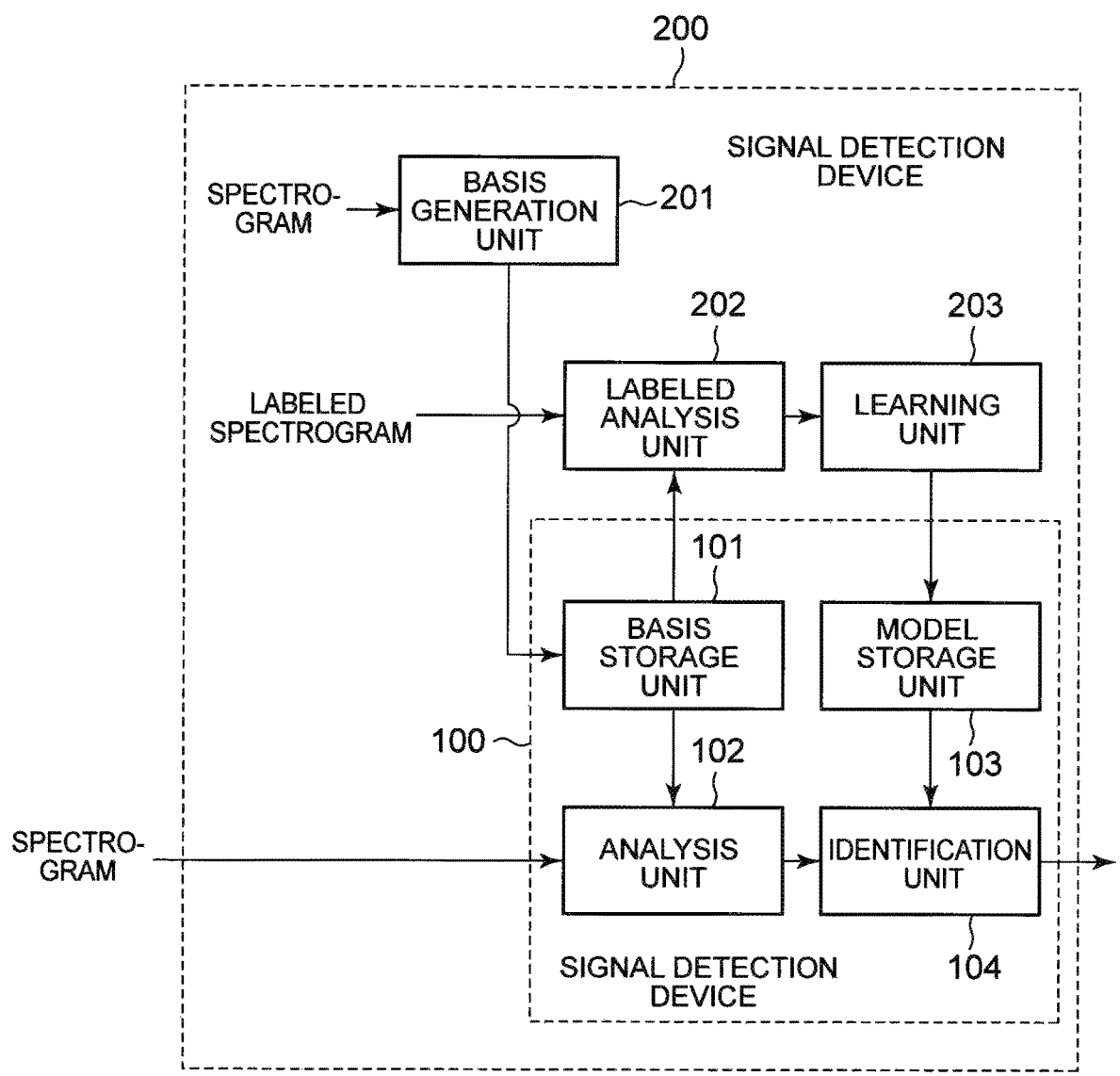
FIG. 3 is a block diagram showing a configuration example of a second exemplary embodiment of a signal detection device according to the present invention.

Next, a second exemplary embodiment of the present invention will be described with reference to the drawings. FIG. 3 is a block diagram showing a configuration example of a second exemplary embodiment of a signal detection device according to the present invention. A signal detection device 200 showed in FIG. 3 inputs a target signal as a spectrogram and identifies whether an acoustic event to be detected is included in the target signal on the basis of the input spectrogram.

The signal detection device 200 showed in FIG. 3 includes a signal detection device 100, a basis generation unit 201, a labeled analysis unit 202, and a learning unit 203. The configuration of the signal detection device 100 according to the present exemplary embodiment is similar to that of the signal detection device 100 according to the first exemplary embodiment showed in FIG. 1. In addition, a function of each component of the signal detection device 100 is similar to the function of each component of the first exemplary embodiment.

The basis generation unit 201 has a function of generating a basis dictionary of acoustic elements. The basis generation unit 201 generates the basis dictionary by performing the NMF to a spectrogram $V_0$ including an acoustic element forming an acoustic event to be detected.

To generate the basis dictionary, the basis generation unit 201 computes an initial basis $W_0$ first by performing normal NMF to the spectrogram $V_0$. An example of a cost function D according to the present exemplary embodiment is indicated by the following Formula (16).

[Mathematical Formula 12]

$$D_{KL}(V_0, W_0H) = V_0 \circ \log\left(\frac{V_0}{W_0H}\right) + (W_0H - V_0) \quad \text{Formula (16)}$$

The basis generation unit 201 updates an activation matrix H, for example, as indicated by the following Formula (17). Furthermore, the basis generation unit 201 updates the initial basis $W_0$, for example, as indicated by the following Formula (18).

[Mathematical Formula 13]

$$H \leftarrow H \circ \left\{ W_0^T \left(\frac{V_0}{W_0H}\right) \right\} / W_0^T O \quad \text{Formula (17)}$$

$$W_0 \leftarrow W_0 \circ \left\{ \left(\frac{V_0}{W_0H}\right) H^T \right\} / OH^T \quad \text{Formula (18)}$$

The basis generation unit 201 updates the activation matrix H and the initial basis $W_0$ until a predetermined condition is satisfied. The predetermined condition is, for example, that the value of the cost function D becomes equal to or less than a threshold value. Alternatively, the predetermined condition may be a condition such that the number of updates of the activation matrix H and the initial basis $W_0$ reaches a set number of repetitions. For example, the basis generation unit 201 alternately updates the initial basis $W_0$ and the activation matrix H, and computes a set of the initial basis $W_0$ and the activation matrix H with the minimum cost function $D_{KL}$.

Next, the basis generation unit 201 performs clustering to the initial basis $W_0$ computed in a state where the predetermined condition is satisfied, for example, using the k-means method, and divides it into G classes. By dividing the initial basis $W_0$ into G classes, a centroid vector $\mu^{(g)}$ is obtained. The reference g is an index representing a g-th class. The centroid vector $\mu^{(g)}$ is a vector including representative elements of the initial basis $W_0$ and corresponds to each acoustic element.

Next, the basis generation unit 201 performs the NMF again to the spectrogram $V_0$ using a basis matrix. When the NMF is performed, the basis generation unit 201 uses, for example, a value W1 indicated in the following Formula (19) as an initial value of the basis matrix.

[Mathematical Formula 14]

$$W1 = [w1_1^{(1)}, \ldots, w1_n^{(1)}, \ldots, w1_1^{(G)}, \ldots, w1_n^{(G)}],$$

$$w1_n^{(g)} = \mu^{(g)} \quad \text{Formula (19)}$$

Formula (19) indicates that the number of bases included in each acoustic element is $n^{(g)}$. The reference W1 in Formula (19) is a matrix in which $n^{(g)}$ centroid vectors $\mu^{(g)}$ are arranged.

The cost function D which is used when the NMF is performed again includes a restriction condition such that a distance between the basis of each group and the centroid vector is shortened. An example of the cost function D which is used when the NMF is performed again is indicated by the following Formula (20).

[Mathematical Formula 15]

$$D(V,W,H,C) = D(V_0, WH_0) + \lambda \Omega(H,C) + D(\mu, W) \quad \text{Formula (20)}$$

To obtain a basis matrix W that minimizes the cost function D indicated by Formula (20), the basis generation unit 201 updates the basis matrix W, for example, as indicated in the following Formula (21). To obtain the activation matrix H that minimizes the cost function D indicated by Formula (20), the basis generation unit 201 updates the activation matrix H, for example, as indicated in the following formulas (22) and (23).

[Mathematical Formula 16]

$$W \leftarrow W \circ \left\{ \left( \frac{V_0}{WH} \right) H^T + \eta \frac{W1}{W} \right\} / (OH^T + \eta O) \quad \text{Formula (21)}$$

$$H \leftarrow H \circ \left\{ W^T \left( \frac{V_0}{WH} \right) \right\} / W^T O \quad \text{Formula (22)}$$

$$h_t^{(g)} \leftarrow h_t^{(g)} / (1 + \lambda/\varepsilon + \|h_t^{(g)}\|) \quad \text{Formula (23)}$$

The reference $h_t^{(g)}$ in Formula (23) represents an element of the activation matrix H corresponding to a basis of which an associated acoustic element ID is g.

The basis generation unit 201 updates the basis matrix W and the activation matrix H until a predetermined condition is satisfied. The predetermined condition is, for example, that the value of the cost function D becomes equal to or less than a threshold value. Alternatively, the predetermined condition may be a condition such that the number of updates of the basis matrix W and the activation matrix H reaches a set number of repetitions. For example, the basis generation unit 201 repeatedly performs each update processing according to the formulas (21) to (23) in order until the predetermined condition is satisfied.

After the update processing, the basis generation unit 201 generates a basis matrix W in which $n^{(g)}$ bases respectively express G acoustic elements. The $n^{(g)}$ bases represent an amplitude of each acoustic element.

Furthermore, the basis generation unit 201 generates a vector indicating correspondence between a row of the basis matrix W and a group of the acoustic element IDs as an acoustic element ID vector. The basis generation unit 201 may change the number $n^{(g)}$ according to the amplitude of each acoustic element. Furthermore, the basis generation unit 201 may set all the $n^{(g)}$ to be the same.

Figure 4B:
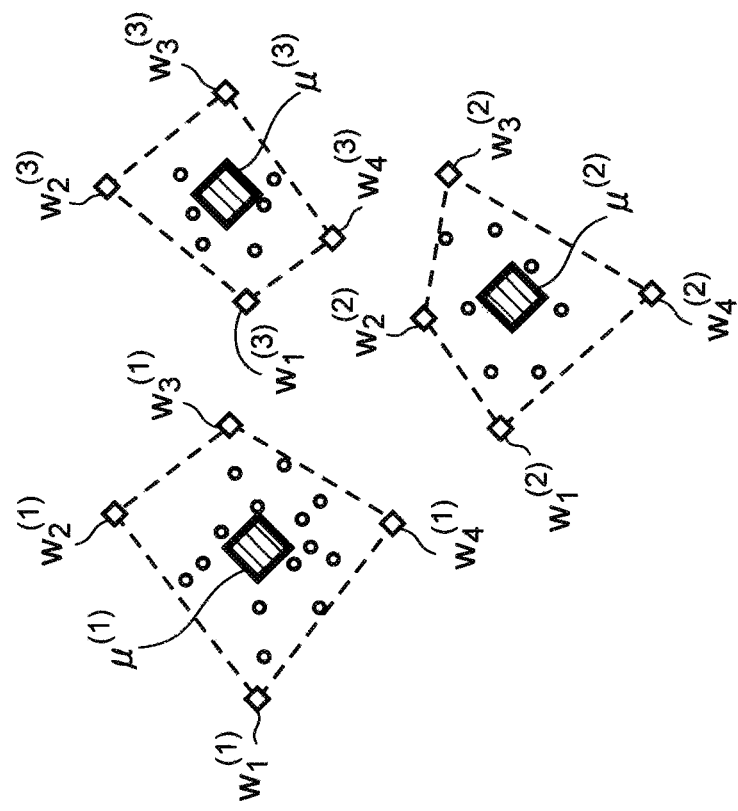
FIG. 4B is an explanatory diagram showing a relationship between bases included in a basis matrix W and acoustic elements.
Figure 4A:
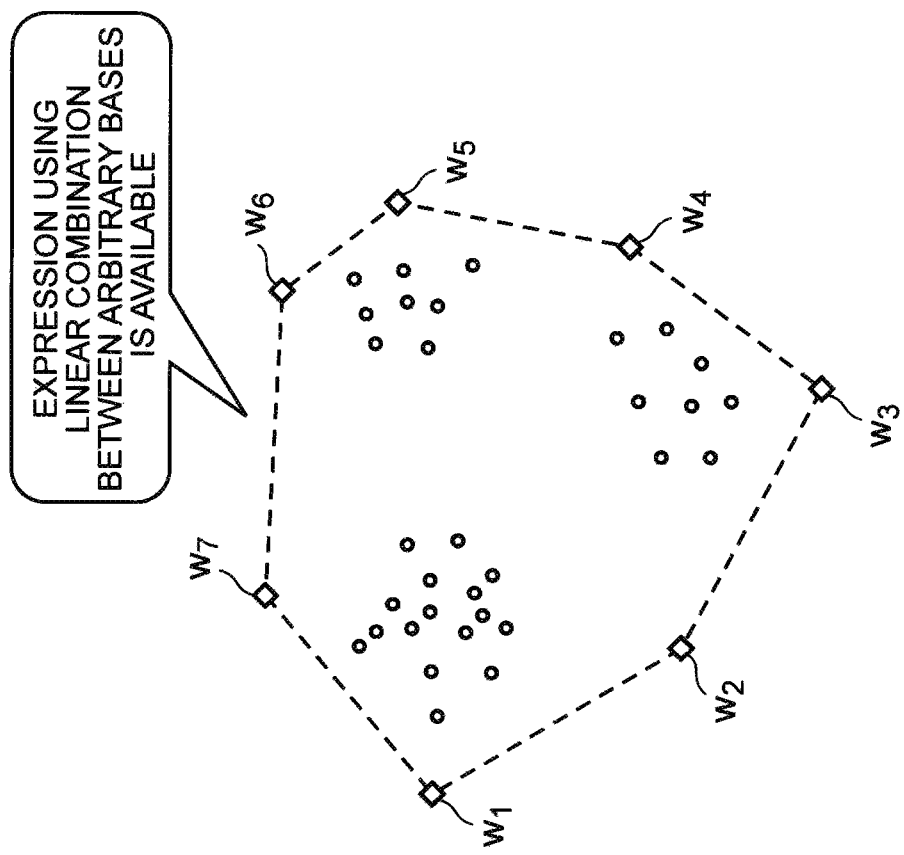
FIG. 4A is an explanatory diagram showing a relationship between bases included in a basis matrix W and acoustic elements.

With reference to FIG. 4A and FIG. 4B, a difference between the basis matrix W in which bases generated by the basis generation unit 201 surrounds the acoustic element as described above and a basis matrix generated by a general NMF will be described.

FIG. 4A and FIG. 4B are explanatory diagrams showing a relationship between bases included in a basis matrix W and acoustic elements. A circle showed in FIG. 4A and FIG. 4B is a spectrum. In FIG. 4A and FIG. 4B, the spectra forming a spectrogram including three acoustic elements are showed on a two-dimensional plane. In addition, a white rectangle showed in FIG. 4A and FIG. 4B is a basis. A broken line showed in FIG. 4A and FIG. 4B is a linear combination between the bases.

In FIG. 4A, a relationship between the bases forming the basis matrix generated by the general NMF and the acoustic elements is showed. The white rectangles showed in FIG. 4A respectively correspond to bases $w_1$ to $w_7$. The bases $w_1$ to $w_7$ are obtained when the NMF is performed to the spectrogram including the spectra showed in FIG. 4A.

In the general NMF, the spectrogram is expressed as a linear sum of the basis with non-negative weighting coefficients (that is, activation). For example, a range expressed by the linear sum of the bases $w_1$ to $w_7$ is a range surrounded by the base $w_1$ to $w_7$ showed in FIG. 4A.

When a basis matrix is generated with the general NMF, the basis matrix is generated without considering the distribution of the acoustic elements. Therefore, the basis matrix to be generated is expressed as a single large distribution of the bases as showed in FIG. 4A. No particular correspondence is found between the distribution of the bases and the distribution of the acoustic elements showed in FIG. 4A. That is, since the spectrogram is expressed by the linear sum of arbitrary bases in the general NMF, the activation obtained by the NMF is not stable.

In FIG. 4B, a relationship between the bases included in the basis matrix generated by the basis generation unit 201 and the acoustic elements is showed. A shaded rectangle showed in FIG. 4B is a centroid vector.

White rectangles showed in FIG. 4B respectively correspond to bases $w_1^{(1)}$ to $w_4^{(1)}$, bases $w_1^{(2)}$ to $w_4^{(2)}$, and bases $w_1^{(3)}$ to $w_4^{(3)}$. Furthermore, the shaded rectangles showed in FIG. 4B respectively correspond to centroid vectors $\mu^{(1)}$ to $\mu^{(3)}$.

As showed in FIG. 4B, for example, the bases $w_1^{(1)}$ to $w_4^{(1)}$ are generated under the restriction for making the bases be closer to the centroid vector $\mu^{(1)}$. Since the centroid vector corresponds to the acoustic element, by adding the condition for making the bases be closer to the centroid vector, the bases $w_1^{(1)}$ to $w_4^{(1)}$ are generated to surround the acoustic elements. The bases $w_1^{(2)}$ to $w_4^{(2)}$ and the bases $w_1^{(3)}$ to $w_4^{(3)}$ are generated similarly to the bases $w_1^{(1)}$ to $w_4^{(1)}$.

That is, as described above, the basis generation unit 201 generates the basis matrix W under the restriction of making each basis be closer to the centroid vector $\mu^{(g)}$. Therefore, the bases included in the basis matrix W are generated to surround the acoustic element.

Thus, the spectrum corresponding to each acoustic element is expressed by only the activation corresponding to the acoustic element. The basis matrix W generated by the basis generation unit 201 is stored in the basis storage unit 101.

The labeled analysis unit 202 has a function of performing the NMF relative to a labeled spectrogram. The labeled analysis unit 202 receives the labeled spectrogram as an input, and performs the NMF to the input labeled spectrogram to compute a labeled activation matrix.

The labeled spectrogram is a spectrogram to which a label indicating whether a corresponding acoustic signal is to be detected is attached. In addition, in a case where the corresponding acoustic signal is a signal to be detected, a label indicating the acoustic event to which the acoustic signal corresponds is attached to the labeled spectrogram.

When the NMF is performed, the labeled analysis unit 202 uses the basis matrix W generated by the basis generation unit 201 and stored in the basis storage unit 101.

The learning unit 203 has a function of learning an identification model used by the identification unit 104. For example, the learning unit 203 learns a matrix A representing an identification surface of a SVM and a vector b. When the learning unit 203 learns the SVM, a label indicating which acoustic event is included in the acoustic signal of the activation is required.

Therefore, the learning unit 203 learns the SVM using the labeled activation matrix computed by the labeled analysis unit 202. The learning unit 203 stores the learned matrix A representing the identification surface of the SVM and the learned vector b in the model storage unit 103.

Similar to the first exemplary embodiment, the basis generation unit 201 according to the present exemplary embodiment can generate a basis including a time structure by performing Convolutive-NMF instead of the general NMF. In a case of where the basis including the time structure is generated, formats of formulas used by the basis generation unit 201 are replaced with formats corresponding to the formulas (11), (14), and (15).

[Description of Operation]

Figure 5:
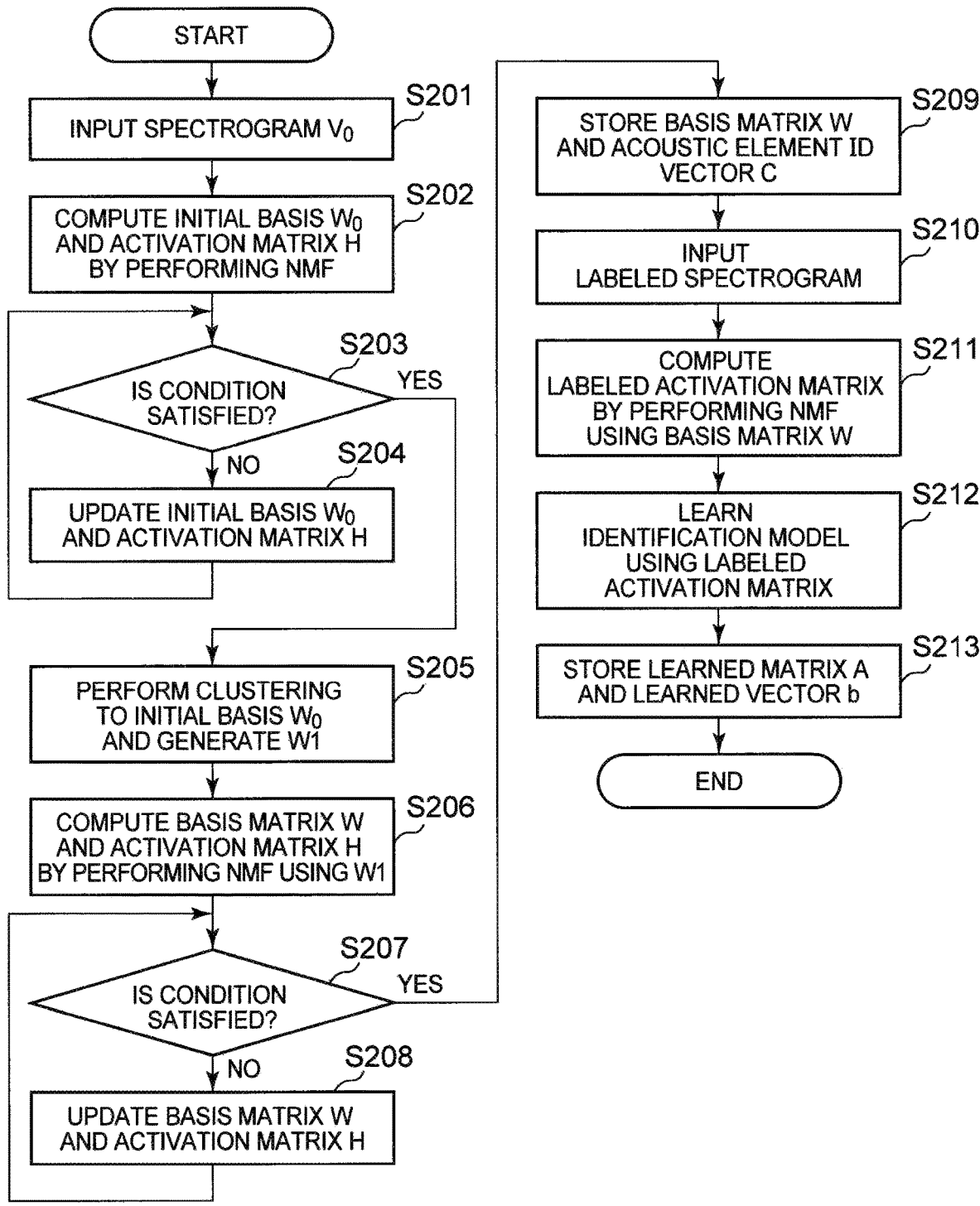
FIG. 5 is a flowchart showing an operation of basis matrix and identification model generation processing by a signal detection device 200 according to the second exemplary embodiment.

Hereinafter, an operation of the signal detection device 200 according to the present exemplary embodiment will be described with reference to FIG. 5. FIG. 5 is a flowchart showing an operation of basis matrix and identification model generation processing by the signal detection device 200 according to the second exemplary embodiment.

A spectrogram $V_0$ including an acoustic element included in an acoustic event to be detected is input to the basis generation unit 201 (step S201).

Next, the basis generation unit 201 performs the NMF to the input spectrogram $V_0$. By performing the NMF, the basis generation unit 201 computes an initial basis $W_0$ and an activation matrix H (step S202).

Next, the basis generation unit 201 confirms whether a predetermined condition is satisfied (step S203). When the predetermined condition is satisfied (Yes in step S203), the basis generation unit 201 performs the processing in step S205.

When the predetermined condition is not satisfied (No in step S203), the basis generation unit 201 updates the computed initial basis $W_0$ and activation matrix H (step S204). After the update, the basis generation unit 201 confirms again whether the predetermined condition is satisfied (step S203).

The predetermined condition is, for example, that the value of the cost function D as described above becomes equal to or less than the threshold value, or that the number of times of updates reaches a set number of repetitions. The predetermined condition may be a condition other than the above condition.

Next, the basis generation unit 201 performs clustering to the initial basis $W_0$ in a state where the predetermined condition is satisfied. The basis generation unit 201 generates a matrix W1 on the basis of a centroid vector generated by clustering (step S205).

Next, the basis generation unit 201 performs the NMF again to the input spectrogram $V_0$ using the generated matrix W1. By performing the NMF, the basis generation unit 201 computes the basis matrix W and the activation matrix H (step S206).

Next, the basis generation unit 201 confirms whether a predetermined condition is satisfied (step S207). When the predetermined condition is satisfied (Yes in step S207), the basis generation unit 201 performs the processing in step S209.

When the predetermined condition is not satisfied (No in step S207), the basis generation unit 201 updates the computed basis matrix W and activation matrix H (step S208). After the update, the basis generation unit 201 confirms again whether the predetermined condition is satisfied (step S207).

The predetermined condition is, for example, that the value of the cost function D as described above becomes equal to or less than the threshold value, or that the number of times of updates reaches a set number of repetitions. The predetermined condition may be a condition other than the above condition.

Next, the basis generation unit 201 stores the basis matrix W in a state where the predetermined condition is satisfied in the basis storage unit 101. Furthermore, the basis generation unit 201 generates an acoustic element ID vector C on the basis of the basis matrix W. The basis generation unit 201 stores the generated acoustic element ID vector C in the basis storage unit 101 (step S209).

Next, a labeled spectrogram is input to the labeled analysis unit 202 (step S210).

The labeled analysis unit 202 performs the NMF to the input labeled spectrogram using the basis matrix W stored in the basis storage unit 101 in the processing in step S209. By performing the NMF, the labeled analysis unit 202 computes a labeled activation matrix (step S211).

The labeled analysis unit 202 inputs the computed labeled activation matrix to the learning unit 203. Next, the learning unit 203 learns an identification model using the input labeled activation matrix (step S212).

Next, the learning unit 203 stores the learned identification model in the model storage unit 103 (step S213). After the identification model has been stored, the signal detection device 200 terminates the basis matrix and identification model generation processing.

The signal detection processing by the signal detection device 200 according to the present exemplary embodiment is similar to the signal detection processing showed in FIG. 2.

[Description of Effect]

In addition to the features of the first exemplary embodiment, in the signal detection device according to the present exemplary embodiment, the basis generation unit can generate the basis matrix directly representing the acoustic element, and the analysis unit can extract the acoustic element with high accuracy by performing the NMF using the generated basis matrix. That is, in both cases where a signal-to-noise ratio is high and where the signal-to-noise ratio is low, the signal detection device according to the present exemplary embodiment can more accurately detect the acoustic event than the first exemplary embodiment.

Third Exemplary Embodiment

[Description of Configuration]

Next, a third exemplary embodiment of the present invention will be described with reference to the drawings. FIG.

6 is a block diagram showing a configuration example of the third exemplary embodiment of a signal detection device according to the present invention. A signal detection device 300 showed in FIG. 6 inputs a target signal as a spectrogram and identifies whether an acoustic event to be detected is included in the target signal on the basis of the input spectrogram.

Figure 6:
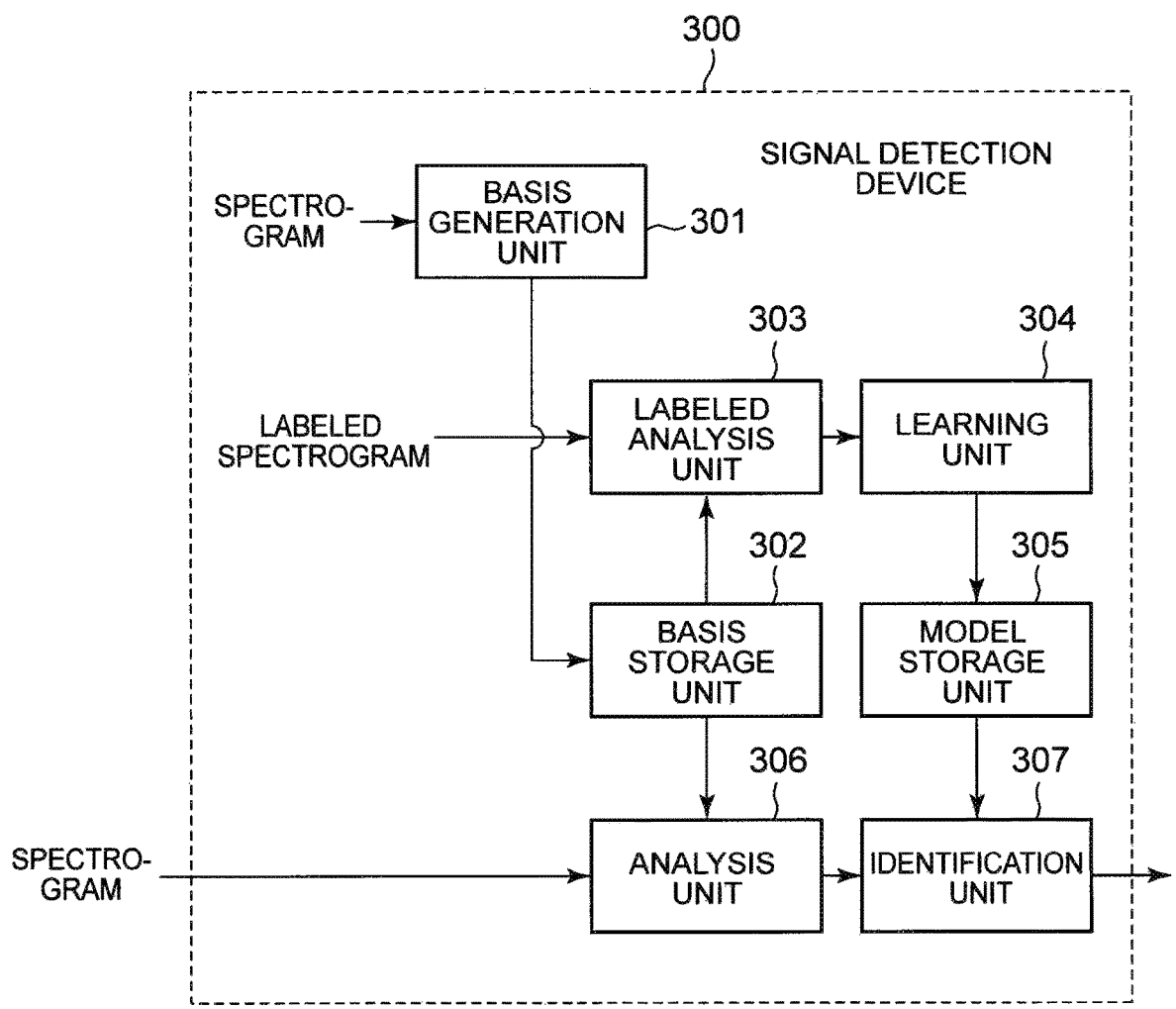
FIG. 6 is a block diagram showing a configuration example of a third exemplary embodiment of a signal detection device according to the present invention.

The signal detection device 300 showed in FIG. 6 includes a basis generation unit 301, a basis storage unit 302, a labeled analysis unit 303, a learning unit 304, a model storage unit 305, an analysis unit 306, and an identification unit 307. That is, the configuration of the signal detection device 300 according to the present exemplary embodiment is similar to that of the signal detection device 200 according to the second exemplary embodiment showed in FIG. 3.

The basis generation unit 301 according to the present exemplary embodiment has a different function from that of the basis generation unit 201 according to the second exemplary embodiment. Components other than the basis generation unit 301 are the same as those of the second exemplary embodiment.

The basis generation unit 301 has a function of performing restricted NMF. The basis generation unit 301 receives a spectrogram for basis generation as an input and performs the restricted NMF to compute a basis matrix. As the spectrogram for basis generation, for example, a spectrogram including an acoustic element forming an acoustic event to be detected is used.

The basis storage unit 302 stores the basis matrix computed by the basis generation unit 301. The labeled analysis unit 303 receives a labeled spectrogram as an input and performs the NMF using the basis matrix stored in the basis storage unit 302 to compute a labeled activation matrix.

In addition, the learning unit 304 learns an identification model using the labeled activation matrix computed by the labeled analysis unit 303. Furthermore, the model storage unit 305 stores the identification model learned by the learning unit 304.

In addition, the analysis unit 306 receives a spectrogram of a target signal as an input and performs normal NMF to the input spectrogram using the basis matrix stored in the basis storage unit 302 to compute an activation matrix.

In addition, the identification unit 307 performs identification processing using the activation matrix computed by the analysis unit 306 and the identification model stored in the model storage unit 305, and detects an acoustic event. As described above, the functions of the components other than the basis generation unit 301 are similar to those of the components according to the second exemplary embodiment.

Furthermore, as in the first exemplary embodiment, the identification unit 307 can perform identification processing using the SVM or the hidden Markov model. The learning unit 304 generates an identification model according to the identification scheme used by the identification unit 307. The model storage unit 305 stores the identification model according to the identification scheme used by the identification unit 307.

Hereinafter, the restricted NMF performed by the basis generation unit 301 according to the present exemplary embodiment will be described. As the restricted NMF, Convex-NMF will be described as an example.

When the Convex-NMF based on clustering is used, a basis matrix expressing an acoustic element on the basis of a spectrogram is directly generated. The reason is because the basis matrix W is expressed by a linear sum of the spectrogram V in a case where the Convex-NMF is used. That is, the basis matrix W is expressed as W=VG using a weight coefficient matrix G.

An example of a cost function D used when the basis generation unit 301 performs the Convex-NMF is indicated by the following Formula (24).

[Mathematical Formula 17]

$$D_F(V,WH)=\|V-VGH^T\|$$ Formula (24)

The example of the cost function D indicated by Formula (24) is an example in which Frobenius norm is used as a cost function. The Frobenius norm is the sum of square errors of all the elements. Here, each square error is for each element in a matrix.

The basis generation unit 301 updates the weight coefficient matrix G, for example, as indicated in the following Formula (25). The basis generation unit 301 updates an activation matrix H, for example, as indicated in the following Formula (26).

[Mathematical Formula 18]

$$G \leftarrow G \circ \sqrt{\frac{(V^TV)H}{(V^TV)GH^TH}}$$ Formula (25)

$$H \leftarrow H \circ \sqrt{\frac{G^T(V^TV)}{HG^T(V^TV)G}}$$ Formula (26)

Each spectral basis forming the basis matrix W=VG extracted by the basis generation unit 301 does not express the amplitude of the acoustic element. However, since the basis generation unit 301 directly generates a spectral basis by the linear sum of the spectrogram V and extracts a spectral basis more accurately expressing an acoustic element, it is possible to express the acoustic element with a single basis.

[Description of Operation]

Figure 7:
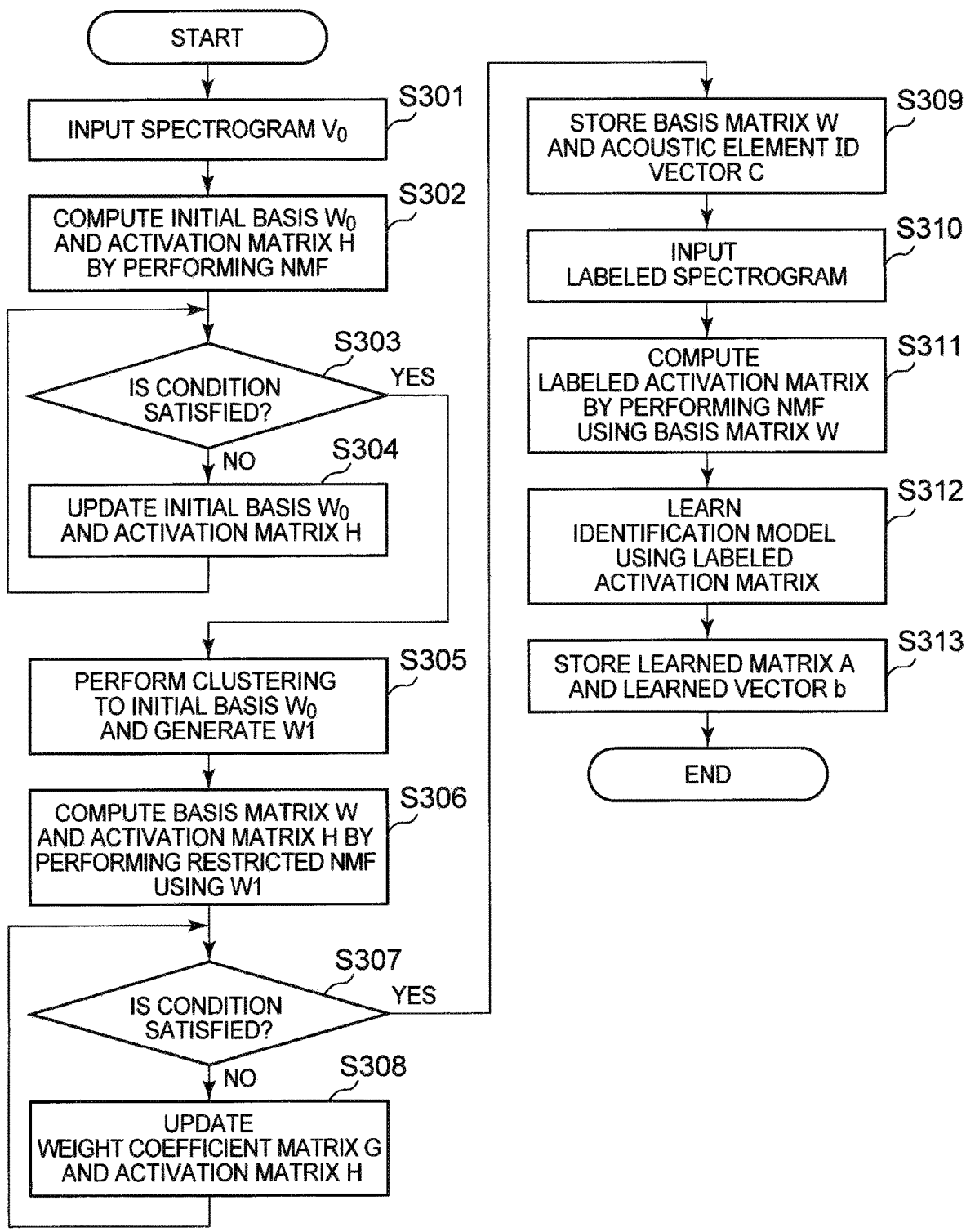
FIG. 7 is a flowchart showing an operation of basis matrix and identification model generation processing by a signal detection device 300 according to the third exemplary embodiment.

Hereinafter, an operation of the signal detection device 300 according to the present exemplary embodiment will be described with reference to FIG. 7. FIG. 7 is a flowchart showing an operation of basis matrix and identification model generation processing by the signal detection device 300 according to the third exemplary embodiment.

Processing in steps S301 to S305 is similar to the processing in steps S201 to S205 showed in FIG. 5.

The basis generation unit 301 performs the restricted NMF to the input spectrogram $V_0$ using the generated matrix W1. By performing the restricted NMF, the basis generation unit 301 computes the basis matrix W (step S306).

Next, the basis generation unit 301 confirms whether a predetermined condition is satisfied (step S307). When the predetermined condition is satisfied (Yes in step S307), the basis generation unit 301 performs the processing in step S309.

When the predetermined condition is not satisfied (No in step S307), the basis generation unit 301 updates the weight coefficient matrix G forming the computed basis matrix W and the activation matrix H (step S308). After the update, the basis generation unit 301 confirms again whether the predetermined condition is satisfied (step S307).

The predetermined condition is, for example, that the value of the cost function D as described above becomes equal to or less than the threshold value, or that the number of times of updates reaches a set number of repetitions. The predetermined condition may be a condition other than the above condition.

Processing in steps S309 to S313 is similar to the processing in steps S209 to S213 showed in FIG. 5.

The signal detection processing by the signal detection device 300 according to the present exemplary embodiment is similar to the signal detection processing showed in FIG. 2.

[Description of Effect]

Even when the target signal includes the acoustic event to be detected and other sounds in a mixed state, the signal detection device according to the present exemplary embodiment can extract the acoustic element without an effect of the noise by performing the NMF. This is because, since the spectral basis included in the basis matrix used in the present exemplary embodiment is generated by the linear sum of the spectrogram, each basis represents the acoustic element, and the activation of each basis corresponds to the expression degree of each acoustic element.

Therefore, the signal detection device according to the present exemplary embodiment can form the basis dictionary with the bases as many as the number of acoustic elements included in the spectrogram. That is, in both cases where a signal-to-noise ratio is high and where the signal-to-noise ratio is low, the signal detection device can more accurately detect the acoustic event, and a computation amount of the signal detection device is less than that of the first and second exemplary embodiments.

The present invention has been described with reference to the exemplary embodiments. However, the present invention is not limited to the exemplary embodiments.

For example, in each exemplary embodiment, it has been described that a spectrogram obtained by performing short-time Fourier transformation to the acoustic signal is used as the spectrogram V. Other than the spectrogram obtained by the short-time Fourier transformation, the spectrogram V may be a matrix generated by other frequency analysis method such as wavelet transformation. As long as a matrix uses additive values to which the NMF can be performed, any matrix can be used as the spectrogram V. In addition, the type of transformation processing relative to the acoustic signal and the type of the acoustic signal are not limited.

Furthermore, the present invention may be applied to a system including a plurality of devices, or may be applied to a single device.

In addition, the present invention can be applied such as an information processing program for realizing the functions of the exemplary embodiments is supplied to a system or a device. The information processing program may be directly supplied from a universal serial bus (USB) memory and the like to the device or may be supplied from a remote place.

That is, a program installed to a computer, a medium storing the program, or the World Wide Web (WWW) server which transfers the program to another server which is communicably connected, to realize the functions of the present invention by a computer, are included in the scope of the present invention.

In particular, at least a non-transitory computer readable medium storing a program for causing the computer to execute processing steps included in the above exemplary embodiments is included in the scope of the present invention.

In addition, each unit in the signal detection device of each exemplary embodiment may be realized by a hardware circuit.

Various changes which can be understood by those skilled in the art within the scope of the present invention can be made to the configuration and detailed structure of the present invention. In addition, a system or a device having an element in which the features of the exemplary embodiments are combined to each other is included in the scope of the present invention.

Figure 8:
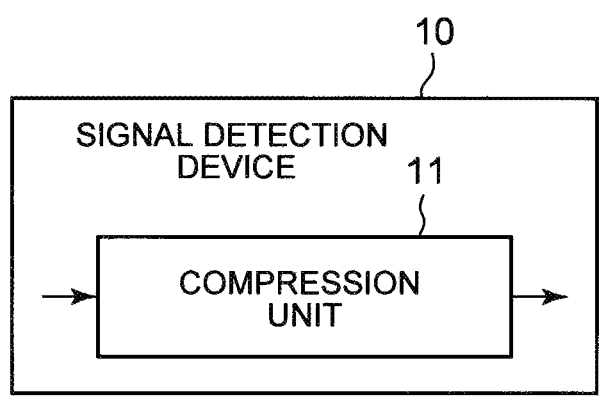
FIG. 8 is a block diagram showing an outline of a signal detection device according to the present invention.

Next, an outline of the present invention will be described. FIG. 8 is a block diagram showing an outline of the signal detection device according to the present invention. A signal detection device 10 showed in FIG. 8 inputs a target signal as a spectrogram and identifies whether an acoustic event to be detected is included in the target signal on the basis of the input spectrogram.

The signal detection device 10 according to the present invention includes a compression unit 11 (for example, analysis unit 102) for compressing an activation matrix by adding to each column an element of the row corresponding to a basis mapped to the information of the same acoustic element in an activation matrix computed by non-negative matrix factorization using a basis matrix, using the information of acoustic elements making up an acoustic event, mapped to the basis constituting the basis matrix.

With such a configuration, the signal detection device can accurately detect the acoustic event.

In addition, the signal detection device 10 may include a detection unit (for example, identification unit 104) for detecting the acoustic event included in the acoustic signal corresponding to the spectrogram formed of the activation matrix using the compressed activation matrix and a detection model used to detect the acoustic event.

With such a configuration, the signal detection device can identify presence or absence of the acoustic event using the compressed activation matrix and the identification model.

In addition, the signal detection device 10 may include a generation unit (for example, basis generation unit 201) for generating the basis matrix including the bases respectively corresponding to the acoustic elements by performing the non-negative matrix factorization to the spectrogram including the acoustic element forming the acoustic event so as to satisfy a predetermined condition.

With such a configuration, the signal detection device can generate the basis matrix in which the spectral bases surround the acoustic element.

In addition, the signal detection device 10 may include an analysis unit (for example, labeled analysis unit 202) for performing the non-negative matrix factorization to the spectrogram associated with information indicating whether the corresponding acoustic signal is a signal to be detected using the basis matrix generated by the generation unit.

With such a configuration, the signal detection device can generate the labeled activation matrix.

In addition, the signal detection device 10 may include a learning unit (for example, learning unit 203) for learning the detection model using the activation matrix including the elements associated with the information indicating the acoustic event included in the acoustic signal corresponding to the element.

With such a configuration, the signal detection device can learn the identification model using the labeled activation matrix.

Furthermore, the generation unit may generate the basis matrix by performing restricted non-negative matrix factorization.

With such a configuration, the signal detection device can extract the acoustic element without being influenced by noise even when the target signal includes the acoustic event to be detected and other sounds in a mixed state.

Furthermore, the signal detection device 10 may include a basis storage unit (for example, basis storage unit 101) for storing the basis matrix and the acoustic element ID information and a model storage unit (for example, model storage unit 103) for storing the detection model. Furthermore, the compression unit 11 may compute the activation matrix by receiving the spectrogram as an input and performing the non-negative matrix factorization using the basis matrix stored in the basis storage unit.

The present invention has been described with reference to the exemplary embodiments and examples above. However, the present invention is not limited to the exemplary embodiments and examples. Various changes which can be understood by those skilled in the art can be made to the configuration and detailed structure of the present invention within the scope of the present invention.

This application claims priority based on Japanese Patent Application No. 2015-182816 filed on Sep. 16, 2015, the disclosure of which is incorporated herein in its entirety.

REFERENCE SIGNS LIST 10, 100, 200, 300 Signal detection device
11 Compression unit
101, 302 Basis storage unit
102, 306 Analysis unit
103, 305 Model storage unit
104, 307 Identification unit
201, 301 Basis generation unit
202, 303 Labeled analysis unit
203, 304 Learning unit

The invention claimed is:

1. A signal detection device comprising:
a compression unit implemented at least in hardware and configured to compress an activation matrix by adding to each column an element of a row corresponding to a basis mapped to information of the same acoustic element in the activation matrix computed by non-negative matrix factorization using a basis matrix, using information of acoustic elements making up an acoustic event, mapped to the basis constituting the basis matrix.

2. The signal detection device according to claim 1, comprising:
a detection unit implemented at least in the hardware and configured to detect the acoustic event included in ft an acoustic signal corresponding to a spectrogram formed of the activation matrix using the compressed activation matrix and a detection model used to detect the acoustic event.

3. The signal detection device according to claim 2, comprising:
a generation unit implemented at least in the hardware and configured to generate the basis matrix including bases respectively corresponding to the acoustic elements by performing the non-negative matrix factorization to the spectrogram including the acoustic element forming the acoustic event so as to satisfy a predetermined condition.

4. The signal detection device according to claim 3, comprising:
a learning unit implemented at least in the hardware and configured to learn the detection model using the activation matrix including elements associated with information indicating the acoustic event included in the acoustic signal corresponding to the element.

5. The signal detection device according to claim 3, comprising:
an analysis unit implemented at least in the hardware and configured to perform the non-negative matrix factorization to a spectrogram associated with information indicating whether corresponding acoustic signal is a signal to be detected using the basis matrix generated by the generation unit.

6. The signal detection device according to claim 5, comprising:
a learning unit implemented at least in the hardware and configured to learn the detection model using the activation matrix including elements associated with information indicating the acoustic event included in the acoustic signal corresponding to the element.

7. The signal detection device according to claim 2, comprising:
a learning unit implemented at least in the hardware and configured to learn the detection model using the activation matrix including elements associated with information indicating the acoustic event included in the acoustic signal corresponding to the element.

8. The signal detection device according to claim 1, comprising:
a generation unit implemented at least in the hardware and configured to generate the basis matrix including bases respectively corresponding to the acoustic elements by performing the non-negative matrix factorization to the spectrogram including the acoustic element forming the acoustic event so as to satisfy a predetermined condition.

9. The signal detection device according to claim 8, comprising:
a learning unit implemented at least in the hardware and configured to learn the detection model using the activation matrix including elements associated with information indicating the acoustic event included in the acoustic signal corresponding to the element.

10. The signal detection device according to claim 8, comprising:
an analysis unit implemented at least in the hardware and configured to perform the non-negative matrix factorization to a spectrogram associated with information indicating whether corresponding acoustic signal is a signal to be detected using the basis matrix generated by the generation unit.

11. The signal detection device according to claim 10, comprising:
a learning unit implemented at least in the hardware and configured to learn the detection model using the activation matrix including elements associated with information indicating the acoustic event included in the acoustic signal corresponding to the element.

12. The signal detection device according to claim 10, comprising:
a learning unit implemented at least in the hardware and configured to learn the detection model using the activation matrix including elements associated with information indicating the acoustic event included in the acoustic signal corresponding to the element.

13. A signal detection method comprising:
compressing, by a processor, an activation matrix by adding to each column an element of a row corresponding to a basis mapped to information of the same acoustic element in the activation matrix computed by non-negative matrix factorization using a basis matrix, using information of acoustic elements making up an acoustic event, mapped to the basis constituting the basis matrix.

14. The signal detection method according to claim 13, comprising:

detecting, by the processor, the acoustic event included in an acoustic signal corresponding to a spectrogram formed of the activation matrix using the compressed activation matrix and a detection model used to detect the acoustic event.

15. A non-transitory computer-readable recording medium having recorded therein a signal detection program for causing a computer to perform processing comprising:

compression processing of compressing an activation matrix by adding to each column an element of a row corresponding to a basis mapped to information of the same acoustic element in the activation matrix computed by non-negative matrix factorization using a basis matrix, using information of acoustic elements making up an acoustic event, mapped to the basis constituting the basis matrix.

16. The signal detection program according to claim 15, wherein the processing further comprises detection processing of detecting the acoustic event included in an acoustic signal corresponding to a spectrogram formed of the activation matrix using the compressed activation matrix and a detection model used to detect the acoustic event.

* * * * *